United States Patent
Jaini et al.

(10) Patent No.: US 9,578,083 B1
(45) Date of Patent: *Feb. 21, 2017

(54) DYNAMICALLY DESIGNING SHARED CONTENT

(71) Applicant: Google Inc., Mountain View, CA (US)

(72) Inventors: Shiva Rama Krishna Jaini, Santa Clara, CA (US); Nicola Ann Crane, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,690

(22) Filed: Sep. 28, 2015

Related U.S. Application Data

(63) Continuation of application No. 13/829,993, filed on Mar. 14, 2013, now Pat. No. 9,148,469.

(51) Int. Cl.
  *G06F 15/16* (2006.01)
  *H04L 29/08* (2006.01)

(52) U.S. Cl.
  CPC .............. *H04L 67/02* (2013.01); *H04L 67/10* (2013.01)

(58) Field of Classification Search
  USPC .......................... 709/204, 217, 246, 220, 224
  See application file for complete search history.

(56) References Cited

U.S. PATENT DOCUMENTS

| | | | |
|---|---|---|---|
| 7,552,042 B1 | 6/2009 | Brebner et al. | |
| 9,148,469 B1* | 9/2015 | Jaini | H04L 67/02 |
| 2006/0101742 A1 | 5/2006 | Scott-Leikach et al. | |
| 2007/0079236 A1* | 4/2007 | Schrier | G06F 17/217 715/206 |
| 2007/0157105 A1* | 7/2007 | Owens | H04L 67/36 715/771 |
| 2008/0148266 A1* | 6/2008 | Caselli | G06F 17/30545 718/102 |
| 2009/0282005 A1* | 11/2009 | Kim | G06F 17/3089 |
| 2010/0217565 A1* | 8/2010 | Wayne | G06F 17/5004 703/1 |
| 2010/0217566 A1* | 8/2010 | Wayne | G06F 17/50 703/1 |
| 2010/0217639 A1* | 8/2010 | Wayne | G06Q 10/103 705/7.23 |
| 2010/0217724 A1* | 8/2010 | Wayne | G06Q 10/067 705/348 |
| 2010/0241711 A1* | 9/2010 | Ansari | G06Q 30/04 709/205 |
| 2010/0271642 A1* | 10/2010 | Huang | H04N 1/603 358/1.9 |
| 2011/0145514 A1 | 6/2011 | Lee et al. | |

(Continued)

*Primary Examiner* — Jude Jean Gilles
(74) *Attorney, Agent, or Firm* — Lowenstein Sandler LLP

(57) ABSTRACT

A system and method for dynamically designing shared content served via a content sharing source. The system includes a content size determination unit to determine a size of content sourced from the content sharing source; a shared content size allocation unit to determine a size of the shared content based on the size of the content; a shared content rules database to determine a design style associated with the shared content based on the determined size of the shared content; and a shared content transmitting unit to communicate the shared content in accordance with the design style to the content sharing source.

20 Claims, 4 Drawing Sheets

(56) References Cited

U.S. PATENT DOCUMENTS

| | | | |
|---|---|---|---|
| 2011/0289156 A1* | 11/2011 | Pirnazar | G06F 17/30873 709/206 |
| 2012/0010995 A1* | 1/2012 | Skirpa | G06F 3/0481 705/14.49 |
| 2012/0072847 A1* | 3/2012 | Lee | G06F 3/0483 715/738 |
| 2012/0178368 A1* | 7/2012 | Fleck | H04W 52/0274 455/41.2 |
| 2012/0191783 A1 | 7/2012 | Yang | |
| 2012/0274728 A1* | 11/2012 | Yasoshima | H04N 7/15 348/14.07 |
| 2012/0321008 A1 | 12/2012 | Krishnaswamy et al. | |
| 2013/0117366 A2* | 5/2013 | Tsukagoshi | G06F 17/3028 709/204 |
| 2013/0159429 A1* | 6/2013 | Nalliah | H04L 51/22 709/206 |
| 2013/0191927 A1* | 7/2013 | Miura | G06Q 10/101 726/26 |

* cited by examiner

DYNAMICALLY DESIGNING SHARED CONTENT

RELATED APPLICATION

This patent application is a continuation of U.S. Non-Provisional application Ser. No. 13/829,993, filed Mar. 14, 2013, entitled "DYNAMICALLY DESIGNING SHARED CONTENT" which is incorporated by reference herein in its entirety.

BACKGROUND

A content sharing source, such as a video sharing web site, serves content over a network to visitors who access the content sharing source. For example, a visitor may access the video sharing web site via a web browser or mobile application and view a video either presented to or searched for. The video sharing web site may store numerous videos, with each video having a particular size or resolution.

The content sourced from the video sharing web site may be served along with shared content. Shared content is additional content that is provided from either the video sharing web site, or a third-party source, such as an online network. The shared content may be directed towards goods or services. The shared content may be incorporated with meta data, the meta data allowing a visitor to click-through to access additional content associated with shared content.

The shared content may be designed to convey information to the visitor, thus, various elements of design may be incorporated into the shared content, such as graphical images, videos, audio, and textual information. The introduction of shared content may be monetized, thereby providing a revenue stream for the content sharing source or the owner of the content. Thus, the party introducing the shared content is incentivized to increase the likelihood of the shared content being clicked-through or conveying the information associated with the shared content.

When a visitor accesses the video sharing web site, the content may be prominently displayed, while the shared content may augment the display of the content. Depending on the visitor's preference or a predefined attribute associated with the content, the size of the display for the content may vary from other content items.

For example, a visitor viewing the content may decide to resize the content by accessing a resizing option incorporated along with the content sharing source. As the content resizes, other elements on the present display of the video sharing web site may be resized as well. One way to accomplish this is to automatically resize the shared content inversely with the resizing performed on the content.

SUMMARY

A system and method for dynamically designing shared content served via a content sharing source. The system includes a content size determination unit to determine a size of content sourced from the content sharing source; a shared content size allocation unit to determine a size of the shared content based on the size of the content; a shared content rules database to determine a design style associated with the shared content based on the determined size of the shared content; and a shared content transmitting unit to communicate the shared content in accordance with the design style to the content sharing source.

DESCRIPTION OF THE DRAWINGS

The detailed description refers to the following drawings, in which like numerals refer to like items, and in which.

DETAILED DESCRIPTION

Figure 1:
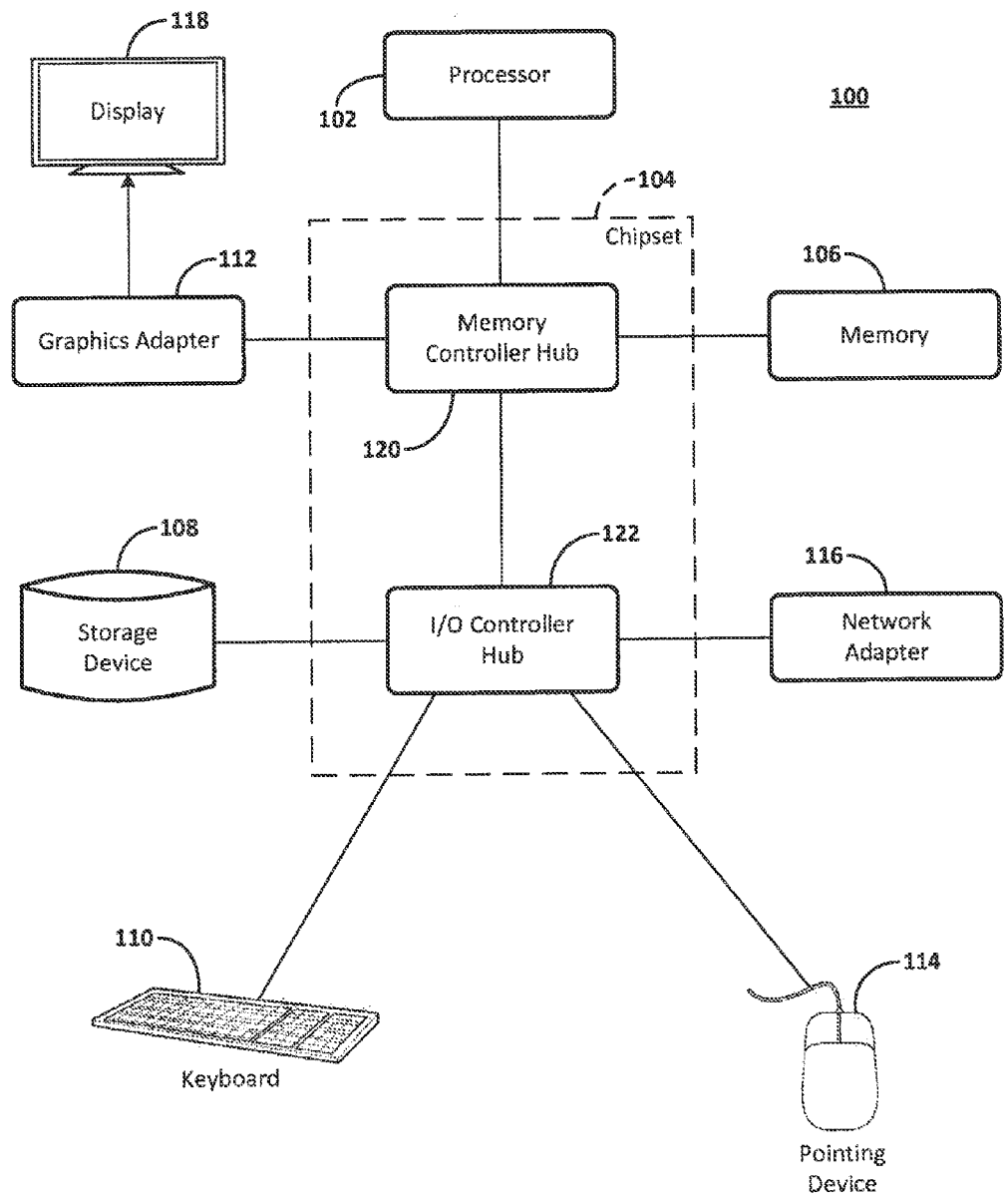
FIG. 1 is a block diagram illustrating an example computer.

When content from a content sharing source is presented to a visitor accessing the content sharing source, shared content may be presented alongside the content to augment the content. As stated above, the operator of the content sharing source is incentivized to present shared content with an increased probability of the visitor clicking-through the shared content. Additionally, the operator of a content sharing source is incentivized to present the shared content in a way that is appealing and informative to the visitor.

The content sharing source may be a video sharing web site, a music sharing web site, an information sharing web site, and the like. The visitor may access the content sharing source via a network, such as the Internet, and navigate and retrieve content stored on the content sharing source. The visitor may use a web browser, a mobile application, and the like.

The content sharing source may allow the visitor to customize the size and display of the content being accessed. For example, a video sharing web site may allow the visitor to resize the video. Thus, if the visitor selects an option to watch the video in a different size, the video sharing web site may dynamically resize, and present the video to the visitor in the selected size.

In the above situation, because the content resizes, other elements on the video sharing web site's display also are resized. However, during the resize operation, the other elements may become less visible. Specifically, in the case of shared content, the shared content may be difficult to view after being resized to a smaller size.

For example, a video associated with the shared content may no longer be viewable (due to being a smaller size), text may no longer be readable, and other detrimental effects may occur. Thus, due to a resizing operation of the content, the shared content may become less effective at encouraging the visitor to be influenced by the shared content or click-through the shared content.

The systems and methods disclosed herein are directed to dynamically designing share content, by detecting a size change of content being served via a content sharing source, and based on the detection, accessing rules associated with the resizing of shared content, and recreating the shared content by selectively choosing the elements to be incorporated into the resized shared content based on the size change.

By employing the systems and methods disclosed herein, a content sharing source ensures that shared content served alongside content is effectively presented. Thus, the shared content is not rendered unintelligible. Due to the shared content being comprehendible, a visitor to the content sharing source is more likely to click-through the shared content.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that PII is removed. For example, a user's identity may be treated so that no PII can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data store, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
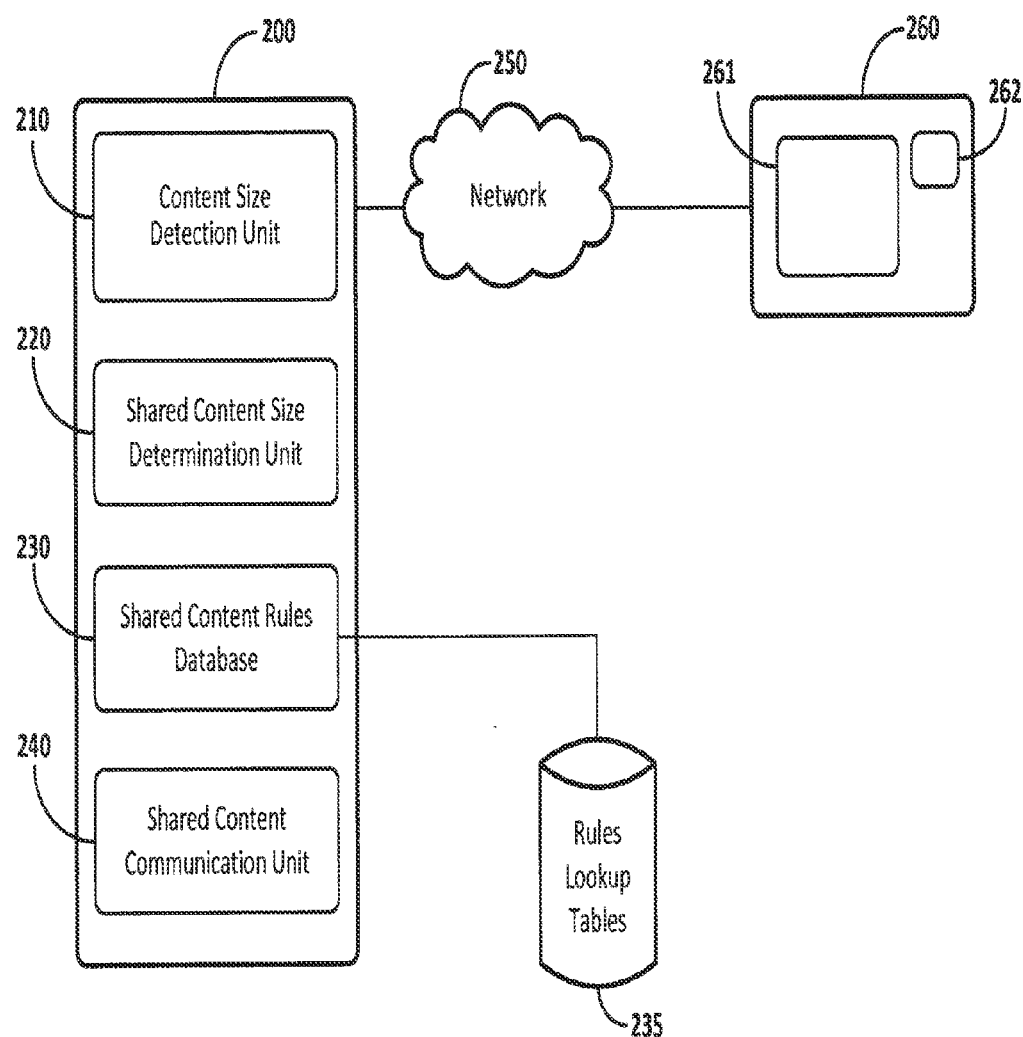
FIG. 2 illustrates an example of a system for dynamically designing shared content.

FIG. 2 is an example of a system 200 for dynamically designing shared content. The system 200 includes a content size detection unit 210, a shared content size determination unit 220, a shared content rules database 230, and a shared content communication unit 240. The system 200 may be implemented on a computer 100 described in FIG. 1.

The system 200 may communicated with a content sharing source 260 via a network 250. Alternatively, the system 200 may be integrated with the content sharing source 260. The content sharing source 260 may be any source of content 262, such as a video sharing web site.

The content size detection unit 210 detects a size associated with content 261 being served by the content sharing source 260. The content size detection unit 210 may detect the size of the content 261 when the content sharing source 260 is first accessed. Additionally, the content size detection unit 210 may detect a size every time a visitor to the content sharing source 260 reconfigures the presentation size of the content 261.

For example, the content may be displayed via an embedded object, such as a media player incorporated as part of a web site. The embedded object may incorporate a selection operation that allows the visitor to select a size associated with the content 261 being displayed. The visitor may decide to select a different size than the present display. In doing so, the content size detection unit 210 may detect that the size of the content 261 being displayed has changed.

The shared content size determination unit 220 determines a new size for the shared content to be displayed. The example in FIG. 2 only shows one shared content item being displayed. However, one of ordinary skill in the art may incorporate the aspects disclose herein with numerous shared content items.

The content size determination unit 220 may determine the new size based on taking the total available screen size, and subtracting the space allocated for the newly sized content 261. Thus, as the content 261 becomes bigger, the available space for shared content 262 may inversely become smaller.

The shared content rules database 230 inputs the new size from the shared content size determination unit 220, accesses a rules lookup table 235, and determines the design of the newly sized shared content 262. The shared content rules database 230 may include instructions dictating which elements of the shared content 262 may be displayed. Further, the rules may also incorporate different rules associated with a layout of the various elements associated with the shared content 262 after resizing.

For example, the shared content 262 may be designed (prior to resizing) to display a video, an image, a headline text, and descriptive text. However, based on the resize, the shared content rules database 230 may contain rules that dictate that the shared content 262 includes only an image and headline text. This rule may be set based on the understanding that newly sized shared content 262 may effectively not be able to display all of the elements after resizing and still be comprehendible to a visitor.

The shared content rules database 230 may store in the rules lookup table 235, different sets of rules for different shared content items, group of shared content items, or the like. Thus, a third-party that submits shared content 262 to the content sharing source 260 may also configure how the shared content 262 is displayed during a resizing.

The shared content communication unit 240 transmits the shared content 262 to the content sharing source 260. The shared content communication unit 240 may transmit the shared content 262 via network 250 to the content sharing source 260. Alternatively, the system 200 may be implemented in an integrated fashion with the content sharing source 260.

Figure 3:
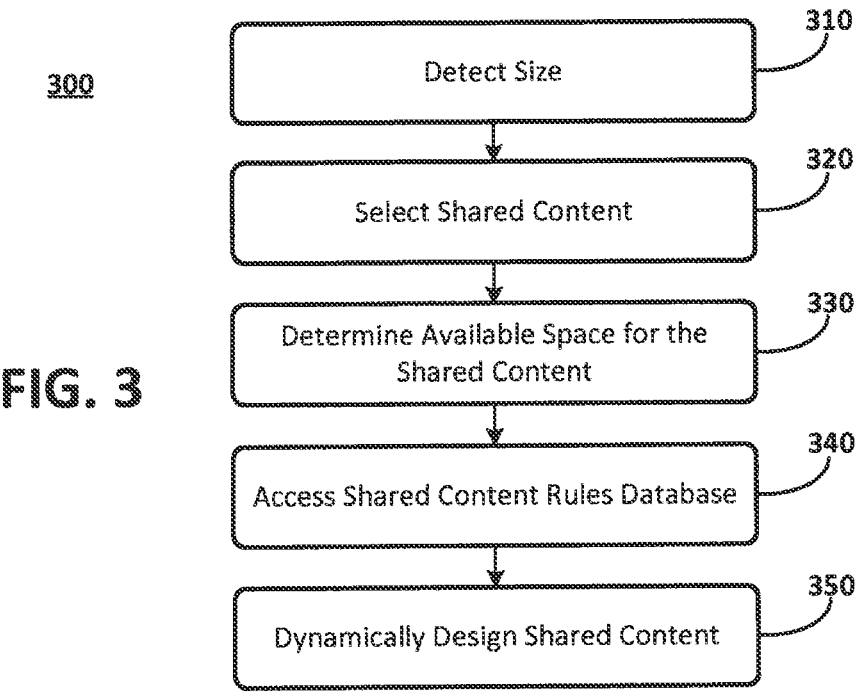
FIG. 3 illustrates an example of a method for dynamically designing shared content.

FIG. 3 is an example method 300 for dynamically designing shared content. The method 300 may be implemented on system 200.

In operation 310, a size associated with the content is ascertained. For example, when a visitor to a content sharing source accesses content, a default size associated with the content may be predetermined for each content item. One content item may be uploaded with a low resolution, a thus, the content may be displayed at a relatively smaller size. While another content item may be uploaded with a high resolution, and thus, the content item may be uploaded with a relatively larger size.

In operation 320, a shared content item may be selected to augment the presentation of the content item. Various techniques for selecting the shared content item may be implemented. For example, shared content may be selected on germaneness to the content being presented. Alternatively, the shared content may be selected randomly.

In operation 330, a size of the shared content to be displayed is determined. The content sharing source may employ various techniques to accomplish this. For example, the content sharing source may determine the available display space, subtract the size of the content item, and allocate a size for the shared content based on the result of the subtraction.

In operation 340, based on the available display space for the shared content determined in operation 330, a shared content rules database may be accessed. Based on the shared content selected to be presented, and a space determined for the shared content, a rule associated with the shared content is retrieved. The rule may indicate various design choices, such as the placement of elements, the elements shown, and the like.

In operation 350, the shared content, designed by the rules retrieved in operation 340, may be transmitted to the visitor of the content sharing source. Thus, when the visitor accesses the content sharing source, the shared content presented alongside the content is presented in a manner that is effective and comprehendible.

Figure 4:
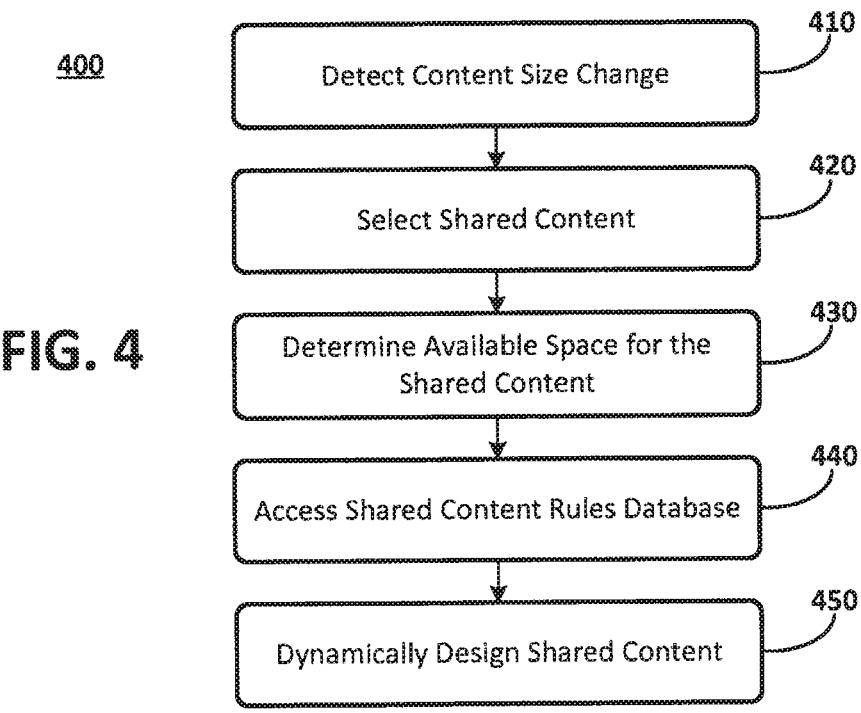
FIG. 4 illustrates an example of a method for dynamically designing shared content.

FIG. 4 is an example of a method 400 for dynamically designing shared content. The method 400 may be implemented on system 200.

In operation 410, a size change associated with content being presently viewed by a visitor to a content sharing source is detected. As explained above, the content sharing source may allow the visitor to resize the display of the content. Alternatively, when the visitor selects a new content item to view, the size of the content item may change from the previously viewed content item. In either case, the space available for shared content may change.

Operations 420 and 450 are substantially similar to operations 320 to 350, respectively. Once again, the presentation of shared content may be dynamically selected, thereby presenting the shared content in a way that is comprehendible while increasing the probability of a click-through.

Figures 5, 6A, 6B:
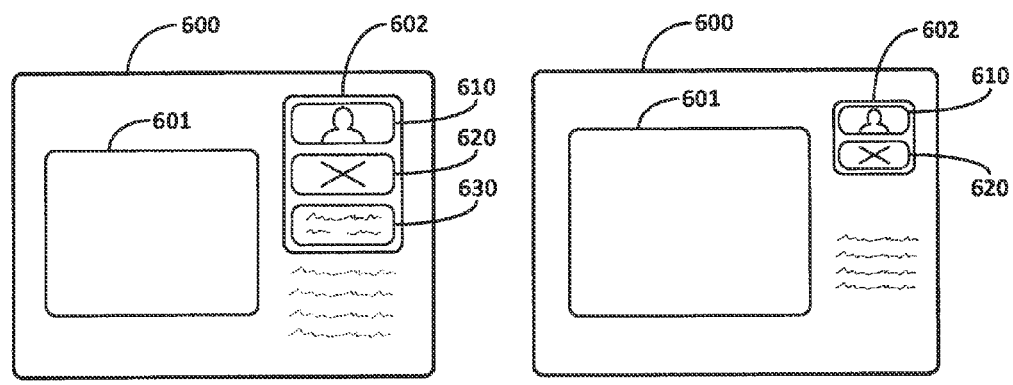
FIG. 5 illustrates an example of a rules lookup table employed by the system in FIG. 2.
FIGS. 6(a) and 6(b) illustrate examples of a content sharing source employing the data in FIG. 5 with the system described in FIG. 2.

FIG. 5 is an example implementation of rules lookup table 235. FIGS. 6(a) and (b) are examples of implementation of system 200 applying the rules in FIG. 5. Rules lookup table 235 includes a shared content name field 501, a size range field 502, elements to display field 503, and a style field 504. The fields selected above are examples, and one of ordinary skill in the art may determine a different combination of the above-enumerated fields and other categories based on a chosen implementation.

The rules lookup table 235 includes entry 510 and entry 520, with rules associated with the display of shared content 602 in relation to the size of content 601.

Entry 510 corresponds to a first size of the content 601 (as indicated in the corresponding entry of size range field 502), while entry 520 corresponds to a second size of the content 601. As indicated in entry 510, an image 610, a headline 620 and a text description 630 are set as being incorporated as part of a design for shared content 602. An example of entry 510 is shown in FIG. 6(a).

For entry 520, an image 610 and a headline 620 are set as being incorporated as part of a design for shared content 602. An example of entry 520 is shown in FIG. 6(b).

As shown in FIGS. 6(a) and 6(b), the amount of space to display a shared content is reduced. Accordingly, employing the aspects disclosed herein, the design of the shared content is dynamically chosen. Thus, by doing so, the shared content is ensured to be comprehendible while increasing the likelihood of the visitor to the content sharing source clicks-through the shared content.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 3 and 4. The disclosed devices, components, and systems contemplate using or implementing any suitable technique for performing the steps illustrated in these figures. Thus, FIGS. 3 and 4 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A method comprising:
   determining, by a processor, a size of shared content in view of the size of a first content sourced from a content sharing source;
   accessing, by the processor, rules associated with the size of the shared content, the rules comprising instructions indicating which elements of the shared content are to be selected for display in view of the size of the shared content; and
   determining, by the processor, presentation characteristics for the shared content based on the rules associated with the size of the shared content.

2. The method of claim 1, wherein the elements of the shared content are to be selected for display to be visible to a viewer.

3. The method of claim 1, wherein the determining of the size of the shared content is in response to the first content being resized.

4. The method of claim 3, wherein the first content is resized in response to an operation of a viewer of the first content.

5. The method of claim 1, further comprising:
   determining, by the processor, a change in the size of the shared content; and
   updating, by the processor, a number of elements to be displayed in view of the change in the size of the shared content.

6. The method of claim 5, wherein the change in size is determined in response to a parameter associated with the first content being different from previously viewed first content.

7. The method of claim 1, wherein the elements comprise a plurality of different types of elements, wherein the plurality of different types of elements comprise at least one of an image, a video, a headline, or a text description.

8. A system comprising:
   a memory; and
   a processor, operatively coupled to the memory, to:
      determine a size of shared content in view of the size of a first content sourced from a content sharing source;
      access rules associated with the size of the shared content, the rules comprising instructions indicating which elements of the shared content are to be selected for display in view of the size of the shared content; and
      determine presentation characteristics for the shared content based on the rules associated with the size of the shared content.

9. The system of claim 8, wherein the elements of the shared content are to be selected for display to be visible to a viewer.

10. The system of claim 8, wherein the size of the shared content is determined in response to the first content being resized.

11. The system of claim 10, wherein the first content is resized in response to an operation of a viewer of the first content.

12. The system of claim 8, wherein the processor is further to:
   determine a change in the size of the shared content; and
   update a number of elements to be displayed in view of the change in the size of the shared content.

13. The system of claim 12, wherein the change in size is determined in response to a parameter associated with the first content being different from previously viewed first content.

14. The system of claim 8, wherein the elements comprise a plurality of different types of elements, wherein the plurality of different types of elements comprise at least one of an image, a video, a headline, or a text description.

15. A non-transitory computer readable storage medium comprising instructions that, when executed by a processor, cause processor to:
   determine a size of shared content in view of the size of a first content sourced from a content sharing source;
   access rules associated with the size of the shared content, the rules comprising instructions indicating which elements of the shared content are to be selected for display in view of the size of the shared content; and
   determine presentation characteristics for the shared content based on the rules associated with the size of the shared content.

16. The non-transitory computer readable storage medium of claim 15, wherein the elements of the shared content are to be selected for display to be visible to a viewer.

17. The non-transitory computer readable storage medium of claim 15, wherein the size of the shared content is determined in response to the first content being resized.

18. The non-transitory computer readable storage medium of claim 15, including further instructions that, when executed by the processor, cause the processor to:
   determine a change in the size of the shared content; and
   update a number of elements to be displayed in view of the change in the size of the shared content.

19. The non-transitory computer readable storage medium of claim 18, wherein the change in size is determined in response to a parameter associated with the first content being different from previously viewed first content.

20. The non-transitory computer readable storage medium of claim 15, wherein the elements comprise a plurality of different types of elements, wherein the plurality of different types of elements comprise at least one of an image, a video, a headline, or a text description.

* * * * *